(12) United States Patent
Pedersen et al.

(10) Patent No.: US 7,555,514 B2
(45) Date of Patent: Jun. 30, 2009

(54) PACKED ADD-SUBTRACT OPERATION IN A MICROPROCESSOR

(75) Inventors: Ronny Pedersen, Trondhelm (NO); Erik K. Renno, Trondheim (NO); Oyvind Strom, Trondheim (NO)

(73) Assignee: Atmel Corportation, San Jose, CA (US)

( * ) Notice: Subject to any disclaimer, the term of this patent is extended or adjusted under 35 U.S.C. 154(b) by 379 days.

(21) Appl. No.: 11/352,711

(22) Filed: Feb. 13, 2006

(65) Prior Publication Data

US 2007/0192396 A1 Aug. 16, 2007

(51) Int. Cl.
G06F 7/50 (2006.01)
(52) U.S. Cl. ..................... 708/670; 708/409
(58) Field of Classification Search ........... 708/402, 708/404, 409, 670
See application file for complete search history.

(56) References Cited

U.S. PATENT DOCUMENTS

| | | | |
|---|---|---|---|
| 5,859,997 A | 1/1999 | Peleg | |
| 6,002,881 A * | 12/1999 | York et al. | 712/34 |
| 6,385,634 B1 | 5/2002 | Peleg | |
| 6,502,117 B2 | 12/2002 | Golliver | |
| 6,754,687 B1 | 6/2004 | Kurak | |
| 6,798,833 B2 * | 9/2004 | Lee et al. | 375/240.03 |
| 6,839,728 B2 | 1/2005 | Pitsianis et al. | |
| 2001/0007110 A1 * | 7/2001 | Shoji | 708/400 |
| 2004/0078404 A1 | 4/2004 | Macy | |
| 2005/0198473 A1 | 9/2005 | Ford | |
| 2006/0015702 A1 | 1/2006 | Khan et al. | |

FOREIGN PATENT DOCUMENTS

WO WO-2007/095408 A2 8/2007

OTHER PUBLICATIONS

ARM L+2, ARM Instruction Set, Quick Reference Card, Doc. # ARM QRC 0001H, (Oct. 2003).
"International Application Serial No. PCT/US2007/60625, International Search Report mailed on Sep. 22, 2008", 2 pgs.
"International Application Serial No. PCT/US2007/60625, Written Opinion mailed on Sep. 22, 2008", 6 pgs.

* cited by examiner

*Primary Examiner*—Chuong D Ngo
(74) *Attorney, Agent, or Firm*—Schwegman, Lundberg & Woessner P.A.

(57) ABSTRACT

A packed half-word addition and subtraction operation is performed by a microprocessor in parallel upon half-word operands obtained from designated top or bottom half-word locations of designated source registers of a register file and the sum and difference results of such operation are packed into respective top and bottom half-word locations of a designated destination register. The microprocessor includes an arithmetic-logic unit (ALU) with adder circuitry that can be selectively split into separate half-word adders that are independently selectable to perform either an addition operation or subtraction operation upon the selected half-word operands. The half-word adders of the ALU access the operands from source registers via a set of multiplexers that select among the top and bottom half-word locations. Operations with halving and saturation modifications to the sum and difference results may also be provided.

10 Claims, 2 Drawing Sheets

Fig. _ 1

PACKED ADD-SUBTRACT OPERATION IN A MICROPROCESSOR

TECHNICAL FIELD

The present invention relates generally to instruction processing and execution of arithmetic operations in computer processing hardware and to specific adaptations of such processing hardware for improving efficiency in the execution of such operations. The present invention relates more particularly to butterfly operations used especially in implementations of the Fast Fourier Transform and related transforms.

BACKGROUND ART

A wide range of applications today, from audio and video signal processing and multimedia compression to automotive collision detection, use discrete transforms of a signal in their algorithms. Such discrete transforms, including, for example, the discrete cosine transform and the discrete Fourier transform, often need to be performed in real time at data rates in excess of tens of megabits per second, which demands not only high clock rates and fast processors, but also efficiency in the transform computations and in the data handling by such processors. Discrete transform operations can often be computed efficiently by using the Fast Fourier Transform (FFT), which comes in two basic "flavors", namely decimation-in-time (Cooley-Tukey) and decimation-in-frequency (Sande-Tukey). Both flavors of the FFT include a so-called "butterfly" computation as a basic computational element. Butterfly computations are also used in other transforms (e.g., Walsh-Hadamard) and in Viterbi encoding/decoding algorithms. Hence, efficient execution of butterfly computations in the processing hardware has considerable value in numerous applications.

A basic butterfly computation involves both addition and subtraction of the real and imaginary components of complex operands. For example, in the decimation-in-time FFT variant, representative pseudo-code for performing one butterfly operation with complex values a, b, ci, A and B is given as follows, where Re( ) and Im( ) represent the respective real and imaginary components of a complex value:

$Re(tmp):=Re(b)Re(ci)-Im(b)Im(ci);$ $Im(tmp):=Re(b)Im(ci)+Im(b)Re(ci);$ $Re(A):=Re(a)+Re(tmp);$ $Re(B):=Re(a)-Re(tmp);$ $Im(A):=Im(a)+Im(tmp);$ $Im(B):=Im(a)-Im(tmp);$ From this computation we can see that there are two occurrences of both addition and subtraction operations upon the same input operands.

If the precision of the fixed-point operands that are used in a computation are half that of the microprocessor's word length, and if the microprocessor's ALU supports single-instruction, multiple-data (SIMD) instructions for operating upon packed half-words, then the microprocessor might be used to perform both addition and subtraction in one operation. For example, the ARM11 processor, provided by ARM Limited (incorporated in the United Kingdom), has instructions that can perform half-word addition and subtraction at the same time upon packed data. Thus, the instructions SADDSUBX Rd, Rn, Rm and UADDSUBX Rd, Rn, Rm carry out respective signed and unsigned versions of:

$Rd[31:16]:=Rn[31:16]+Rm[15:0]$ and $Rd[15:0]:=Rn[15:0]-Rm[31:16].$

Likewise, the instructions SSUBADDX Rd, Rn, Rm and USUBADDX Rd, Rn, Rm carry out respective signed and unsigned versions of:

$Rd[31:16]:=Rn[31:16]-Rm[15:0]$ and $Rd[15:0]:=Rn[15:0]+Rm[31:16].$

However, these instructions cannot perform the add-subtract operation of a butterfly operation unless both the half-word operands are packed in the same register, which requires extra processing.

U.S. Patent Application Publication No. 2004/0078404 (Macy et al.) describes a processor that can perform, among a number of operations, a horizontal or intra-add-subtract operation on four packed data elements (x3, x2, x1, x0) of a first operand and four packed data elements (y3, y2, y1, y0) of a second operand to produce a result comprising the four packed data elements (y2+y3, y1−y0, x2+x3, x1−x0), or alternatively, (y2−y3, y1+y0, x2−x3, x1+x0), in order that the 8-point decimation-in-time Walsh-Hadamard transform may be efficiently computed. Computation of fast Fourier transforms is also suggested in combination with a SIMD multiplication operation.

U.S. Pat. No. 6,754,687 (Kurak, Jr. et al.) describes a processing system for efficiently computing inverse discrete cosine transforms upon two-dimensional data matrices. The computation includes performing butterfly (BFLYS) instructions comprised of separate add and subtract operations upon either quad half-word data (four packed 16-bit operands) or dual word data (two 32-bit operands).

SUMMARY DISCLOSURE

The invention provides a method of executing a packed half-word addition and subtraction operation where we can specify which half-words to use as operands, even when they are stored in different source registers. The half-word operands can be located in either top or bottom parts of a register or other addressable storage location. The respective sum and difference results are packed into respective top and bottom parts of a designated destination register. Both the addition and subtraction are conducted in parallel. Half-word addition-and-subtraction operations with halving and signed or unsigned saturation modifications to the sum and difference results may also be provided.

The invention also provides modifications to a microprocessor to implement this packed half-word addition and subtraction operation. The processor's ALU can be split into dual half-word adders, and the operands are accessible from the designated source registers via multiplexer controls generated according to the decoded instruction for this operation. The half-word adders can be set to perform addition in one adder and subtraction in the other, with the sum and difference outputs from these adders supplied to respective top and bottom parts of the destination register.

DETAILED DESCRIPTION

The present invention presents a means and method for speeding up parts of the butterfly computation often used to perform a fast Fourier transform or other similar transforms. In particular, a packed half-word addition and subtraction operation upon the same half-word operands may be implemented in a microprocessor. By the term "microprocessor" we mean to include a variety of data processing hardware of both load-store (RISC) and memory-oriented (CISC) architectures, and both general-purpose processors and application-specific processors, such as digital signal processors, as well as embedded processors. The packed add-subtract operation may be indicated to the microprocessor by a corresponding instruction within the processor's instruction set.

An exemplary microprocessor implementation may include a 32-bit word length, with fixed-point numbers used in the computation having a 16-bit (half-word) precision and a (1.15) format, which means that the most significant bit of each half-word denotes the sign while the remaining 15 less significant bits are fraction bits. Half-words may be packed into both top and bottom parts of a register or memory word, with the top part in bits [31:16] being a separate value from the bottom part in bits [15:0]. While it might seem convenient in some instances to put real and imaginary parts of a complex value into corresponding top and bottom parts of the same register or memory word, this is not absolutely essential, nor even desirable from an efficiency standpoint due to requisite reshuffling of data after operations in order to keep the real and imaginary parts of a value together. Usually it is simply best to keep track of their locations in whichever words they may be placed. The flexibility provided by the present invention allows packed add-subtract operations to be performed even when the half-word operands are located in different registers.

Figure 1:
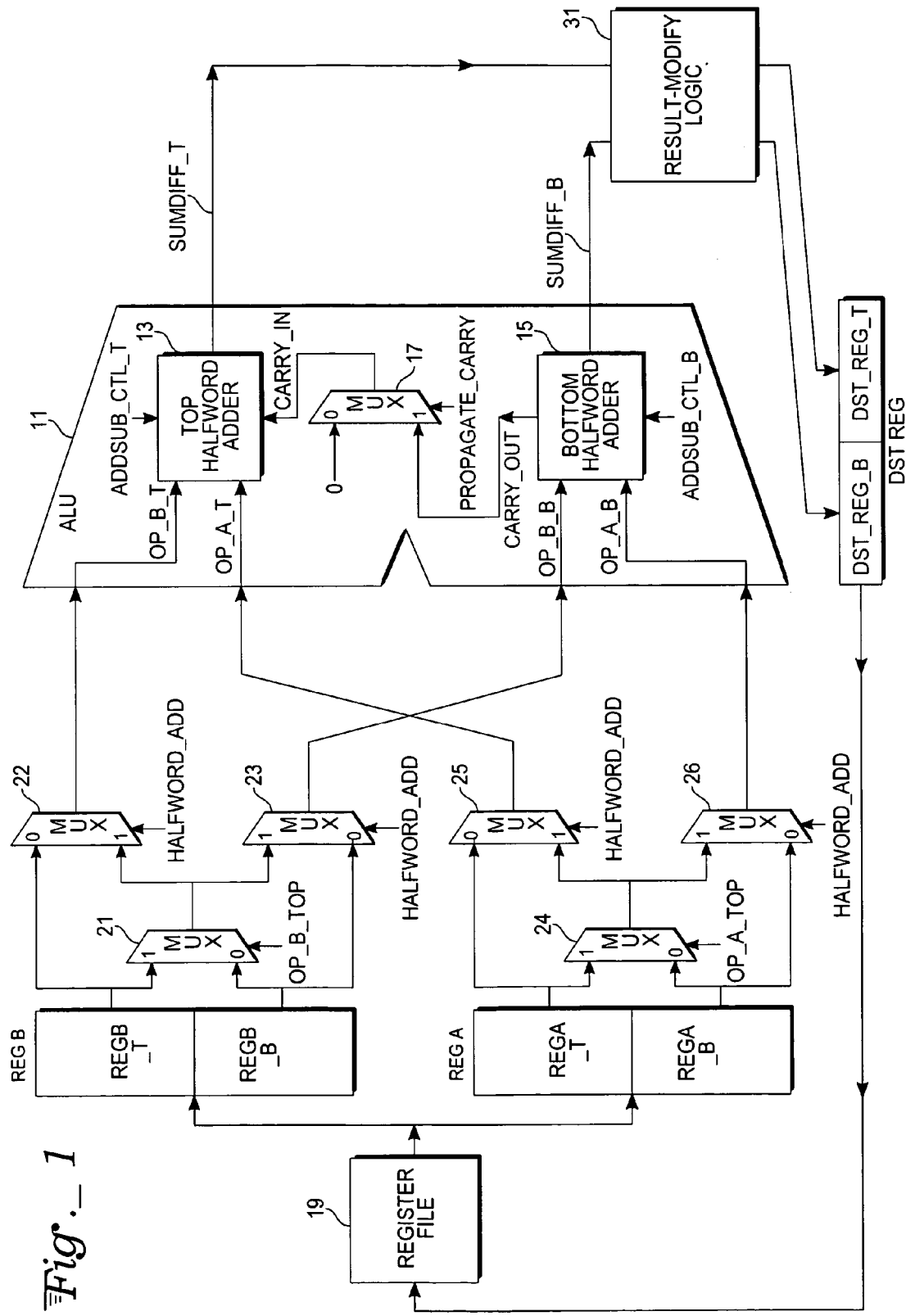
FIG. 1 is a schematic block diagram of an exemplary implementation of relevant portions of microprocessor hardware for executing a packed add-subtract operation in accord with the present invention.

With reference to FIG. 1, relevant portions of a microprocessor are seen, which have been specially adapted to efficiently implement the present invention. An arithmetic-logic unit (ALU) 11 has a multiplexer 17 coupled between two half-word adders 13 and 15. The multiplexer 17 receives a control signal PROPAGATE_CARRY. When this control signal equals 1, the CARRY_OUT from the bottom half-word adder 15 is supplied as a CARRY_IN to the top half-word adder 13, making the components 13, 15 and 17 into a normal full word adder. However, whenever the control signal PROPAGATE_CARRY is set to zero, the CARRY_OUT from the bottom half-word adder 15 is not propagated into the top half-word adder 13. Instead the top half-word adder 13 receives a zero from the multiplexer 17 as its CARRY_IN value. Effectively, setting PROPAGATE_CARRY to zero makes the word adder into two separate half-word adders 13 and 15. This zero control setting is the one used in executing the packed half-word add-subtract operation in accord with the present invention.

The top and bottom half-word adders 13 and 15 also receive respective control signals ADDSUB_CTL_T and ADDSUB_CTL_B that determine whether addition or subtraction is performed, i.e. whether or not the corresponding half-word operand input OP_B_T or OP_B_B is to be complemented. When either or both control signal is set to zero, the value provided at the relevant input OP_B_T or OP_B_B is left unchanged and addition (A+B) is performed. When either or both control signal is set to one, the value provided at the relevant input OP_B_T or OP_B_B is complemented and subtraction (A−B) is performed. For a packed half-word add-subtract operation, one of these control signals, e.g., ADDSUB_CTL_T, is set for addition, while the other of these control signals, e.g., ADDSUB_CTL_B, is set for subtraction, such the top and bottom half-word adders 13 and 15 perform respective addition and subtraction operations upon half-word operands.

The ALU 11 has access to a register file 19 containing various registers. In a packed half-word add-subtract operation, two registers in the register file 19, designated here as REG A and REG B, are indicated by the corresponding instruction as source registers for the operation, while another register in the register file 19, designated here as DST REG, is indicated by the instruction as a destination register for the operation's results. For packed data, each of the registers in the register file has storage locations designated for both a top half-word, i.e., REGA_T, REGB_T, and DST_REG_T, and a distinct bottom half-word, i.e., REGA_B, REGB_B, and DST_REG_B.

For improved flexibility, the ALU 11 has been adapted so that it accesses operands from instruction-specified registers, designated as REG A and REG B, indirectly via a set of multiplexers 21-26 that supply selected half-word operand inputs from the respective source registers REG A and REG B.

A control signal HALFWORD_ADD supplied to multiplexers 22, 23, 25 and 26, when set to zero, causes respective top and bottom half-words from the respective registers A and B registers to be supplied as operand inputs to respective top and bottom half-word adders 1 and 15 of the ALU 11. In combination with the control signal PROPAGATE_CARRY set to one, the ALU 11 will work as a normal full word adder.

However, when HALFWORD_ADD is set to one, the multiplexers 22 and 23 will supply the same half-word selected by multiplexer 21 from REG B as a half-word operand input to both half-word adders 13 and 15. This half-word operand is designated as OP_B_T when input into the top half-word adder 13 and as OP_B_B when input into the bottom half-word adder 15. (In this case where the same half-word is selected as an operand input to both half-word adders 13 and 15, the operand could also be designated generally as OP_B.) Likewise, the multiplexers 25 and 26 will supply the same half-word selected by multiplexer 24 from REG A as a half-word operand input to both half-word adders 13 and 15. This half-word operand is designated as OP_A_T when input into the top half-word adder 13 and as OP_A_B when input into the bottom half-word adder 15. (Likewise, in cases where the same half-word is selected as an operand input to both half-word adders 13 and 15, the operand could also be designated as OP_A.) In combination with the control signal PROPAGATE_CARRY set to zero, the ALU 11 will work as a pair of half-word adders.

The control signals OP_B_TOP and OP_A_TOP supplied to respective multiplexers 21 and 24 determine whether the top or bottom half-word from respective register REG B and REG A is selected. If either or both control signal is set to one, then the corresponding top half-word will be selected as the relevant half-word operand.

Accordingly, some control signal combinations of interest include:
(a) HALFWORD_ADD=0, PROPAGATE_CARRY=1, OP_A_TOP=X (don't care); OP_B_TOP=X, ADDSUB_CTL_T=ADDSUB_CTL_B=0; then DST:=A+B.

This is a normal full-word adder computing a sum.
(b) HALFWORD_ADD=0, PROPAGATE_CARRY=1, OP_A_TOP=X, OP_B_TOP=X, ADDSUB_CTL_T=ADDSUB_CTL_B=1; then DST:=A−B.

This is a normal full-word adder computing a difference.
(c) HALFWORD_ADD=1, PROPAGATE_CARRY=0, OP_A_TOP=0, OP_B_TOP=0, ADDSUB_CTL_T=0, ADDSUB_CTL B=1;
then DST_REG_T:=REGA_B +REGB_B, DST_REG B:=REGA_B−REGB_B.

This places the respective sum and difference of the bottom half-words from registers A and B into the respective top and bottom half-word locations of the destination register.
(d) Same as (c), except ADDSUB_CTL_T=1, ADDSUB_CTL_B=0;
then DST_REG_T:=REGA_B+REGB_B, DST_REG_B:=REGA_B−REGB_B.

This variant places the respective difference and sum of the bottom half-words from registers A and B into the respective top and bottom half-word locations of the destination register.
(e) Same as (c), except OP_A_TOP=1, OP_B_TOP=1;
then DST_REG_T:=REGA_T+REGB_T, DST_REG_B:=REGA_T−REGB_T.

This uses the top half-words from registers A and B as the operands. A variant similar to (d) reversing the destinations of the sum and difference is also possible.
(f) Same as (c), except OP_A_TOP=0, OP_B_TOP=1;
then DST_REG_T:=REGA_B +REGB_T, DST_REG_B:=REGA_B−REGB_T.

This uses the bottom half-word from REG A and the top half-word from REG B as the operands.

Likewise,
(g) Same as (c), except OP_A_TOP=1, OP_B_TOP=0;
then DST_REG_T:=REGA_T+REGB_B, DST_REG_B:=REGA_T−REGB_B.

This uses the top half-word from REG A and the bottom half-word from REG B as the operands.

In either variant (f) or (g), if ADDSUB_CTL_T=1, ADDSUB_CTL_B=0, then as in (d), we can reverse the destination of the sum and difference so that the difference goes into the top half-word of DST REG.

Using a microprocessor with the adaptations seen in FIG. 1, we can more efficiently execute a butterfly computation used in performing transform functions. The butterfly computation resolves to the following exemplary assembly code:
Multiply tmp_real, b_real, ci_real;
Negate ci_imag_neg, ci_imag;
Multiply_accumulate tmp_real, b_imag, ci_imag_neg;
Shift_right tmp_real, tmp_real>>15;
(! The shift right by 15 bits restores the original 16-bit (1.15) format after a 32-bit fixed-point product is generated by the multiplication.)
Multiply tmp_imag, b_real, ci_imag;
Multiply_accumulate tmp_imag, b_imag, ci_real;
Shift_right tmp_imag, tmp_real>>15;
Paddsub.h a_b_real, a_real:b, tmp_real:b;
Paddsub.h a_b_imag, a_imag:b, tmp_imag:b;

In particular, a packed half-word addition and subtraction operation (paddsub.h) can be executed, where the same half-word operands are selected from the top or bottom part of designated source registers and the sum and difference are packed into the respective top and bottom half-words of a designated destination register (without saturation), e.g., options (c) or (e) above. This allows the four previously separate sum and difference operations of the butterfly computation:

$Re(A) := Re(a) + Re(tmp);$ $Re(B) := Re(a) - Re(tmp);$ $Im(A) := Im(a) + Im(tmp);$ $Im(B) := Im(a) - Im(tmp);$ to now be combined into a pair of packed half-word addition-subtraction operations:

PADDSUB.H (a_b_real, a_real:b, tmp_real:b);

PADDSUB.H (a_b_imag, a_imag:b, tmp_imag:b);

where the first stated parameter is the designated destination register and the final two stated parameters are the designated A and B source registers, identified here as using the bottom half-words from those registers.

The equivalent functionality of the operation corresponding to the instruction

PADDSUB.H dstreg, regA:<regApart>, regB:<regBpart> where regApart, regBpart $\in \{t,b\}$, can be conveniently described in pseudocode terms as:

```
If (regApart == t)
    Op_A = regA[wordlength−1 : wordlength/2];
Else
    Op_A = regA[(wordlength/2)−1 : 0];
If (regBpart == t)
    Op_B = regB[wordlength−1 : wordlength/2];
Else
    Op_B = regB[(wordlength/2)−1 : 0];
Rd[wordlength−1 : wordlength/2] := OpA + OpB;
Rd[(wordlength/2)−1 : 0] := OpA − OpB;
```

(Note, however, that the processor hardware carries out this packed add-subtract operation as a single unified action in one operational clock cycle, instead of a sequence of successive steps suggested by the software-like description.) The if-else lines of this functional description are carried out in the processor circuitry of FIG. 1 by the multiplexers 21-26 that select the Op_A and Op_B half-word operand inputs to the ALU 11. The final two lines of the functional description correspond to the addition and subtraction operations carried out by the half-word adders 13 and 15 and by the providing of the sum and difference results to the respective top and bottom half-word locations of the destination register DST REG.

Alternatively, a corresponding instruction, PSUBADD.H, can be used instead. This is identical to the packed addition-subtraction operation PADDSUB.H, described above, except the destination of the sum and difference results are reversed, such that the difference goes into the top half-word and the sum into the bottom half-word.

$Rd$ [wordlength−1: wordlength/2]:=OpA−OpB;

$Rd$ [wordlength/2−1: 0]:=OpA+OpB;

This corresponds to variant (d) and similar reversed-destination versions of variant (e), (f) or (g) and the like, described above.

Other variations of packed addition and subtraction in accord with the present invention are possible. For example, one or more other instructions could provide packed add-subtract operations with halving (paddsubh.sh and psubaddh.sh). Halving involves performing an arithmetic division by two (implemented as a right shift by one bit position) of the half-word sum and difference results before writing them to the destination register. The arithmetic shift right (asr) preserves the sign of the most significant bit, that is:

(asr value [15:0]=({value[15], value [15:1]}), where {a,b} indicates a concatenation of a and b. Halving is often uaed in digital signal processing (DSP) applications, since it allows limiting the growth of the result.

One or more other instructions could provide packed add-subtract operations with signed or unsigned saturation (paddsubs.sh, paddsubs.uh, psubadds.sh, psubadds.uh). Saturation is used to minimize the error caused by an overflow or underflow condition. If the sum or difference of two operands is outside the range representable by the number format, the sum or difference is set to the largest or smallest number value representable by the format.

In the case of unsigned saturation, the half-word values $0000_H$ to $FFFF_H$ can represent natural numbers ranging from 0 to 65535 (or, fractional values 0 to 65535/65536). During addition of positive numbers overflow can occur, while during subtraction of positive numbers underflow can occur. An overflow or underflow condition is detected by the generation of a carry output from the relevant half-word adder. In the case of an overflow resulting from the addition, a saturation value of $FFFF_H$ (the largest unsigned number) is assigned as the result. In the case of an underflow resulting from a subtraction, a saturation value of 0 (the smallest unsigned number) is assigned as the result.

In the case of signed saturation, the half-word values range from −32768 to 32767 (represented by signed bits $8000_H$ to $FFFF_H$ and $0000_H$ to $7FFF_H$). (Equivalent fractional values can also be represented by these signed bits.) Addition of two positive values can exceed the maximum value in the range (overflow), as can subtraction of a negative value from a positive value, in which case the largest (most positive) signed number (presented by $7FFF_H$) will be assigned to the result. Likewise, addition of two negative values, or subtraction of a positive value from negative value, could produce of sum or difference result that falls below the minimum value in the range, in which case the smallest (most negative) signed number (represented by $8000_H$) will be assigned in place of the result. Presence of overflow or underflow, and hence the need for saturation, is detected by determining any of four conditions, i.e.,:

```
if   ( (~addsub_ctl & ((op_a[15] & op_b[15] & ~sumdiff[15]) |
       (~op_a[15] & ~op_b[15] & sumdiff[15] ))) |
       (addsub_ctl & ((op_a[15] & ~op_b[15] & ~sumdiff[15] ) |
       (~op_a[15] & op_b[15] & sumdiff[15] ))) )
```

Here, ~ means logical NOT, & means logical AND, and | means logical OR. An overflow/underflow condition is indicated upon a comparison of the sign bits (half-word bit 15) of each operand and the sum/difference result. Overflow can be distinguished from underflow simply by the sign bit of operand A:

```
If (op_a[15]) then MODOUT[15:0] = 0x8000
else MODOUT[15:0] = 0x7fff;
```

Figure 2:
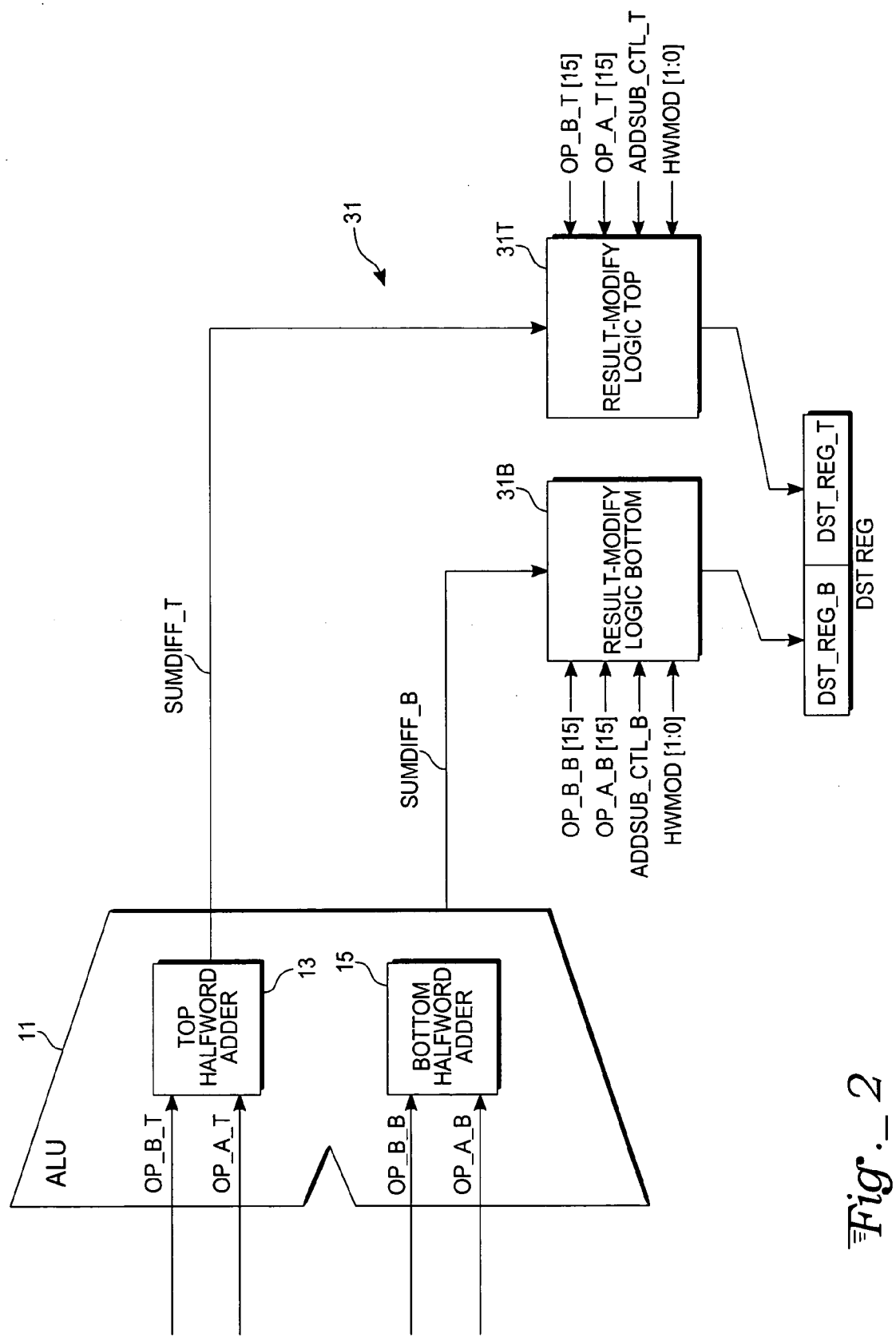
FIG. 2 is a schematic block diagram showing in greater detail the result-modify logic in the implementation of FIG. 1 for executing halving or saturation modifications to a packed add-subtract results prior to storage of the results in a destination register.

To implement the variations, a result-modify logic unit 31 may be inserted between sum/difference outputs, SUMDIFF_T and SUMDIFF_B, output from ALU 11 and the corresponding destination register half-words, DST_REG_T and DST_REG_B. The result-modify logic 31 as seen in FIG. 2 with greater detail as distinct, but generally identical, result-modify logic subunits 31T and 31B for the top and bottom half-word destinations of the respective results SUMDIFF_T and SUMDIFF_B. FIG. 2 also shows the various parameter and control inputs needed by these subunits. Control signals, HWMOD[1:0], applied to such a logic unit 31 would determine which of the variations, i.e., no modification, having, unsigned saturation or signed saturation, is to be applied. Operand inputs to the ALU (the sign bits) are also coupled to the logic subunits 31T and 31B, together with the respective ADDSUB_CTL signals. The logic corresponding to both top and bottom outputs, SUMDIFF_T and SUMDIFF_B, would be identical. The modified output, MODOUT[15:0], from such a logic unit is used as the input to the destination register, DSTREG.

What is claimed is:

1. A method of executing a packed half-word addition and subtraction operation in a single operational cycle of a processor circuit, the method comprising:

selecting a first operand from a designated top or bottom half-word of a designated first source register of a register file;

selecting a second operand from a designated top or bottom half-word of a designated second source register of the register file, the designated second source register not necessarily the same as the designated first source register;

performing, by dual half-word adders, respective half-word addition and half-word subtraction of the selected first and second operands in parallel in a single operational cycle of the processor circuit; and providing a sum and difference resulting from the parallel half-word addition and half-word subtraction operation to respective top and bottom half-word locations of a designated destination register of the register file.

2. The method as in claim 1, further comprising halving the sum and difference via a bit shift prior to providing them to respective top and bottom half-word locations of the designated destination register.

3. The method as in claim 1, further comprising detecting an overflow or underflow condition in the respective sum and difference, and if any such condition is detected then saturating the sum or difference in which such condition occurs prior to providing that sum or difference to the designated destination register.

4. A method of performing an efficient butterfly computation in a processor circuit upon half-word values packed into half-word portions of registers in a register file, the method comprising:

performing a first series of operations upon half-word values stored in designated half-word portions of designated source registers in the register file so a to compute half-word temporary values, and storing said temporary values in half-word portions of one or more registers in the register file; and performing, by dual half-word adders, at least one packed half-word addition and subtraction operation in parallel upon a pair of half-word values including at least one of said temporary values and storing a result of said packed half-word addition and subtraction operation in designated half-word portions of a designated destination register in the register file.

5. The method as in claim 4, wherein said half-word values represent real and imaginary components of complex values.

6. The method as in claim 5, wherein a first packed half-word addition and subtraction operation is performed upon half-word values representing real components of complex values, and a second packed half-word addition and subtraction operation is performed upon other half-word values representing imaginary components of the complex values.

7. A method of performing an efficient butterfly computation in a processor circuit upon complex values a, b and ci, with real and imaginary components of the complex values being half-word values packed into half-word portions of a register file, the method comprising:

performing a series of operations in the microprocessor upon the half-word components of the complex values b and ci to obtain half-word real and imaginary components of a complex temporary value tmp, such that $$Re(tmp):=Re(b)Re(ci)-Im(b)Im(ci); \text{ and} \quad (1)$$

$$Im(tmp):=Re(b)Im(ci)+Im(b)Re(ci); \quad (2)$$

performing, by dual half-word adders, a first packed half-word addition and subtraction operation in parallel upon the half-word real components of the complex values a and tmp to obtain half-word real components of complex values A and B, such that $$Re(A):=Re(a)+Re(tmp); \text{ and} \quad (1)$$

$$Re(B):=Re(a)-Re(tmp); \quad (2)$$

wherein the real components of a and tmp are obtained from selected top or bottom half-word locations of designated, not necessarily the same, first and second source registers of the register file, and the resulting sum and difference obtained thereby representing the real components of A and B are packed into respective top and bottom half-word locations of a designated first destination register; and performing, by dual half-word adders, a second packed half-word addition and subtraction operation in parallel upon the half-word imaginary components of the complex values a and tmp to obtain half-word imaginary components of the complex values A and B, such that $$Im(A):=Im(a)+Im(tmp); \text{ and} \quad (1)$$

$$Im(B):=Im(a)-Im(tmp); \quad (2)$$

wherein the imaginary components of a and tmp are obtained from selected top or bottom half-word locations of designated, not necessarily the same, third and fourth source registers of the register file, and the resulting sum and difference obtained thereby representing the imaginary components of A and B are packed into respective top and bottom half-word locations of a designated second destination register different from said first destination register.

8. A method comprising:
selecting a first operand from a first source register;
selecting a second operand from a second source register;
selecting a half word or full word mode of operation for two half word adders;
performing, by dual half-word adders, respective half-word addition and half-word subtraction of the selected first and second operands in parallel in a single operational cycle of the processor circuit when half word mode is selected; and
providing a sum and difference resulting from the parallel half-word addition and half-word subtraction operation to respective top and bottom half-word locations of a destination register of the register file when half word mode is selected.

9. The method of claim 8 and further comprising performing a full word addition or subtraction when full word mode is selected.

10. The method of claim 8 wherein each of the first and second operands are half words.

* * * * *

UNITED STATES PATENT AND TRADEMARK OFFICE
CERTIFICATE OF CORRECTION

PATENT NO. : 7,555,514 B2
APPLICATION NO. : 11/352711
DATED : June 30, 2009
INVENTOR(S) : Ronny Pedersen et al.

It is certified that error appears in the above-identified patent and that said Letters Patent is hereby corrected as shown below:

In column 4, line 33, delete "1" and insert -- 13 --, therefor.

In column 5, line 18, delete "REGA_B + REGB_B," and insert -- REGA_B - REGB_B, --, therefor.

In column 5, line 19, delete "REGA_B - REGB_B" and insert -- REGA_B + REGB_B. --, therefor.

In column 7, line 14, delete "uaed" and insert -- used --, therefor.

In column 8, line 64, in Claim 4, delete "a" and insert -- as --, therefor.

In column 9, line 36, in Claim 7, delete "Re(B):-Re(a)-Re(tmp);" and insert -- Re(B):= Re(a)-Re(tmp); --, therefor.

In column 10, line 36, in Claim 9, after "8" delete "and".

Signed and Sealed this

Twelfth Day of January, 2010

David J. Kappos
*Director of the United States Patent and Trademark Office*